United States Patent
Kunz et al.

(10) Patent No.: US 12,003,513 B2
(45) Date of Patent: Jun. 4, 2024

(54) VEHICLE-TO-X COMMUNICATION ARRANGEMENT AND METHOD FOR RECEIVING VEHICLE-TO-X MESSAGES

(71) Applicant: Continental Teves AG & Co. OHG, Frankfurt (DE)

(72) Inventors: Jürgen Kunz, Frankfurt (DE); Marc Menzel, Weimar (DE); Felix Hagenmeyer, Stuttgart (DE)

( * ) Notice: Subject to any disclaimer, the term of this patent is extended or adjusted under 35 U.S.C. 154(b) by 202 days.

(21) Appl. No.: 16/690,176

(22) Filed: Nov. 21, 2019

(65) Prior Publication Data

US 2020/0162481 A1 May 21, 2020

(30) Foreign Application Priority Data

Nov. 21, 2018 (DE) ...................... 10 2018 219 960.4

(51) Int. Cl.
*H04L 9/40* (2022.01)
*H04W 4/40* (2018.01)

(52) U.S. Cl.
CPC ........ *H04L 63/123* (2013.01); *H04L 63/1425* (2013.01); *H04W 4/40* (2018.02)

(58) Field of Classification Search
CPC ..... H04L 63/123; H04L 63/1425; H04W 4/40
USPC ......................................................... 726/22
See application file for complete search history.

(56) References Cited

U.S. PATENT DOCUMENTS

| | | | | |
|---|---|---|---|---|
| 2013/0218415 | A1* | 8/2013 | Stahlin | B60W 30/09 701/41 |
| 2014/0006615 | A1* | 1/2014 | Karnik | H04L 63/1441 709/225 |
| 2015/0271185 | A1* | 9/2015 | Rommele | H04L 9/3247 713/176 |
| 2018/0026949 | A1* | 1/2018 | Kimn | H04L 9/0827 713/156 |
| 2018/0143650 | A1* | 5/2018 | Klaus | B60W 10/06 |
| 2018/0255562 | A1* | 9/2018 | Cho | H04W 72/10 |
| 2019/0324450 | A1* | 10/2019 | Lurie | H04L 9/3247 |

FOREIGN PATENT DOCUMENTS

| | | |
|---|---|---|
| DE | 102010046843 A1 | 6/2011 |
| DE | 102012218488 A1 | 6/2014 |
| WO | WO-2018182074 A1 * 10/2018 | ............ B60W 30/18 |

OTHER PUBLICATIONS

Dr. Hariharan Krishnan, Verify-on-Demand—A Practical and Scalable Approach for Broadcast Authentication in Vehicle-to-Vehicle Communication, IP.com, Oct. 10, 2008.
German Search Report dated Aug. 14, 2019 for corresponding German Patent Application No. 10 2018 219 960.4.

* cited by examiner

*Primary Examiner* — Cheikh T Ndiaye
*Assistant Examiner* — Ayele F Woldemariam

(57) ABSTRACT

A vehicle-to-X communication arrangement has a decision unit and a vehicle-to-X communication module, wherein the vehicle-to-X communication module forwards vehicle-to-X messages together with a signature to the decision unit which performs a safety check using the respective signature.

8 Claims, 1 Drawing Sheet

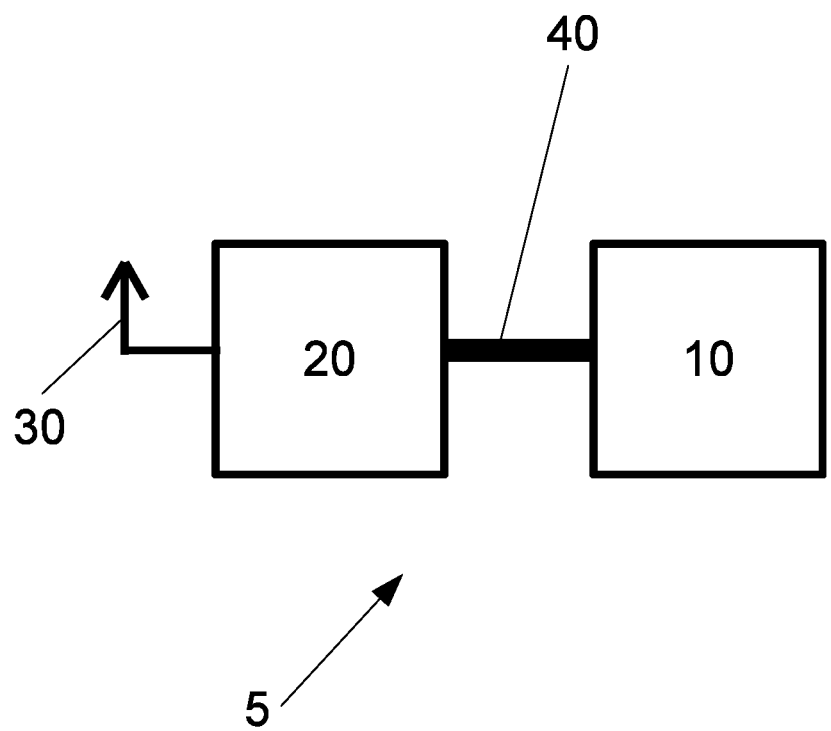

VEHICLE-TO-X COMMUNICATION ARRANGEMENT AND METHOD FOR RECEIVING VEHICLE-TO-X MESSAGES

CROSS-REFERENCE TO RELATED APPLICATIONS

This application claims priority to German Application DE 10 2018 219 960.4, filed Nov. 21, 2018. The disclosures of the above applications are incorporated herein by reference.

TECHNICAL FIELD

The invention relates to a vehicle-to-X communication arrangement as well as a method for receiving vehicle-to-X messages.

BACKGROUND

Vehicle-to-X communication is currently being developed and standardized. Safety is a very important aspect during the development of vehicle-to-X communication. In particular, this means that a recipient of a message has to be able to assume that a received message originates in a reliable manner from a vehicle or from an infrastructure facility and has not been modified on the transmission route. The relevant standards regarding this are in particular IEEE 802.11p, IEEE 1609, SAE 2735, SAE 2945 and ETSI ITS-G5. In addition, new standards are currently being drawn up by 3GPP for C-V2X. However, the explanations provided herein are not restricted to the communication technologies named. Communication in accordance with ASIL B and better on vehicle networks constitutes the prior art, for example with corresponding AUTOSAR modules.

It is pointed out that the German term "Sicherheit" denotes a combination of the English terms "safety" and "security". The term "safety" denotes in particular the resistance to unintentional modifications of a message or other disturbances which can occur, for example due to technical malfunctions. The term "security" denotes in particular the resistance to an intentional modification which, as a general rule, has been made with malicious intent. Where the term "Sicherheit" is used within the framework of the German application, this means both safety and security, provided that it is not clear from the context that one or the other term can be applied.

A system, which makes possible, for example, automated driving functions, usually has multiple sensors such as radars or cameras and a central decision computer or respectively a decision unit. A vehicle-to-X communication module would be integrated into this system as an additional sensor. In order to guarantee the necessary functional safety, all of the information from the transmitter or respectively sensor up to the decision unit is typically protected against changes, and/or measures are provided in order to identify changes. To this end, known techniques such as, for example, time stamps, CRC (Cyclic Redundancy Check) and monotonic message counters are used in order to identify changes in the communication. In the case of vehicle-to-X communication data, it must be heeded that the information is transmitted not only in the vehicle, but also between the vehicles in a way that is safe from modifications. To this end, the ETSI and IEEE/SAE standards offer so-called security signing which ensures, on the one hand, that messages have not been modified with a probability of $\frac{1}{2}^{256}$, regardless of whether intentionally or unintentionally, and on the other hand, it is also ensured by means of the attached certificate that the message is trustworthy. The latter is regulated in particular in the standard IEEE 1609.2.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle-to-X communication arrangement has a decision unit and a vehicle-to-X communication module. The vehicle-to-X communication module is configured to receive vehicle-to-X messages having a respective signature and to forward said messages in an unmodified condition including the signature to the decision unit. The decision unit is configured to perform a safety check with each message based on its respective signature.

Due to the described vehicle-to-X communication arrangement, the safety check is completely or partially transmitted by the vehicle-to-X communication module to the decision unit. This results in the selection of the vehicle-to-X communication module and the development thereof. In particular, the vehicle-to-X communication module can be designed with a lower safety standard, wherein the decision unit typically has a high safety standard anyway such as, for example ASIL B, which is consequently also available for the vehicle-to-X communication.

It is pointed out that the concept of forwarding the signature in conjunction with the message to the decision unit is not known. This applies in particular to of subjecting each message, and not only a part of the messages, to a safety check in the decision unit.

The unmodified forwarding can in particular relate to a payload. On a vehicle network, architectural additional measures such as global time sync, E2E protocol or SecOC (Secure Onboard Communication) can supplement the original data.

The safety check typically involves decrypting a hash value contained in the signature with a public key which is likewise contained in the signature as well as calculating a hash value from the respective vehicle-to-X message. If the two hash values are identical, it can be assumed that the message has not been intentionally modified (security) and that the components involved are functioning properly (safety). The safety check can also be used as a substitute for CRC (Cyclic Redundancy Check). Within the framework of the safety check, time stamps can also be checked. The requirements of the standard ISO26262 can, for example, be met therewith. Formal checks, for example range checks, and plausibility checks can also be part of the safety check. Safety can be especially ensured or improved with the aid of the safety check in the decision unit, however the security can additionally or alternatively be improved.

The decision unit can in particular be a control module of a motor vehicle. Such a control module can, for example, have tasks such as driving assistance functions or safety functions implemented. It can also communicate with other components of a motor vehicle, for example via a vehicle bus.

The vehicle-to-X communication module is preferably configured to output received vehicle-to-X messages in an unmodified condition as new vehicle-to-X messages and to execute multihopping functions and/or store-and-forward functions. These are typical tasks of a vehicle-to-X communication module, which can also be executed without its own safety check of the respective message.

The vehicle-to-X communication arrangement preferably further has an antenna which is connected to the vehicle-to-X communication module. This makes possible a direct participation in the vehicle-to-X communication. The vehicle-to-X communication arrangement can, however, also be joined to another antenna, for example an already existing antenna or an antenna which is also used for other tasks.

According to an embodiment, the decision unit and the vehicle-to-X communication module are connected by means of a vehicle bus in order to exchange data. This makes possible a simple and reliable communication between the decision unit and the vehicle-to-X communication module. In particular, the vehicle-to-X communication module and the decision unit can be designed as physically separated units.

The decision unit may have a safety level at least in accordance with the ASIL B standard. This corresponds to a typical implementation of safety in motor vehicles. This is also available to the vehicle-to-X communication in the case of the embodiment according to the invention.

The vehicle-to-X communication module may have a safety level lower than the ASIL B standard. For example, it can have a safety level in accordance with the ASIL QM standard. As a result, it can be designed more simply and less expensively. The embodiment makes it possible for such a lower safety level to be used, without this resulting in restrictions in the safety achieved. In particular, the safety is ensured by the safety check in the decision unit, thus lowering the requirements imposed on the vehicle-to-X communication module regarding this.

The vehicle-to-X communication module may be configured to perform a security check, a certificate check and/or a plausibility check. As a result, safety can be further increased. For example, a security check or safety check can be performed both in the vehicle-to-X communication module and in the decision unit. The security check in the vehicle-to-X communication module can be identical to the safety check, but is typically exclusively or predominantly used for security. A safety check or certificate check in the vehicle-to-X communication module can consequently in particular be used for security, which is typically required prior to the retransmission of messages, for example within the framework of multihopping.

The vehicle-to-X communication module may, for example, have a PHY/MAC layer, a network layer and/or a security layer implemented. The decision unit can, for example, have a facility layer and/or an application layer implemented. They can be combined among themselves and with one another as desired.

The decision unit and the vehicle-to-X communication module may each be configured to independently execute a respective signature verification of a vehicle-to-X message.

In other words, the signature verification can be performed both in the vehicle-to-X communication module and in the decision unit. As a result, safety can be further increased. The signature verification can in particular be the safety check or part of the safety check.

The safety check or signature verification in the vehicle-to-X communication module can, in particular, serve to verify a message prior to retransmission, for example during multihopping. This serves to ensure security. The renewed check in the decision unit increases safety, i.e. it is for example ensured that the message has not been modified within the vehicle between the vehicle-to-X communication module and the decision unit. As a result, the vehicle-to-X communication module can be designed with a lower safety level and, consequently, less expensively.

Furthermore, an embodiment of a method for receiving vehicle-to-X messages has the following steps: receiving of a respective vehicle-to-X message together with the associated signature in a vehicle-to-X communication module, unmodified forwarding of the vehicle-to-X message together with the associated signature to a decision unit, and executing of a safety check for each vehicle-to-X message based on the respective signature by the decision unit.

The already described above with respect to the vehicle-to-X communication arrangement can be achieved by means of the method. In particular, safety tasks can be outsourced from the vehicle-to-X communication module to the decision unit, as a result of which a simpler and less expensive vehicle-to-X communication module can be used, and recourse can be had to a high safety classification of the decision unit, which typically exists anyway, and which is available to the vehicle-to-X communication as well.

The method may be executed by means of a vehicle-to-X communication arrangement.

In general it should be mentioned that an optimized system, which processes vehicle-to-X information at ASIL B level, can perform the security check including the certificate and plausibility checks in the received vehicle-to-X unit and can then forward the unmodified vehicle-to-X communication or vehicle-to-X message to the decision unit. There, a renewed signature check ensures that the content of the communication has not been changed on the way from the vehicle-to-X unit to the decision unit by hardware or software errors. The vehicle-to-X unit or respectively the vehicle-to-X communication module is thus transparent from a security point of view, similar to a bus system. The security of the vehicle network is assumed to exist.

The receiving vehicle-to-X unit or respectively the receiving vehicle-to-X communication module can also assume all of the protocol tasks such as, by way of example, multihopping or "store-and-forward" functions, as defined, by way of example, in ETSI ITS-G5, since these tasks can be handled without altering the message contents or the signature. Following a successful signature check, the decision unit only has to decode and utilize the ASN.1-coded message contents. Due to the independent check of the vehicle-to-X message for modifications in the decision unit, the vehicle-to-X communication unit or respectively the vehicle-to-X communication module does not have to be ASIL B-capable, since all of the errors can be identified in the decision unit which is ASIL B capable anyway.

To ensure that the entire system becomes ASIL B-capable, the signature will typically already be effected in the ASIL B-capable control device, including during the sending of the messages, that is to say, by way of example, in the decision unit. In ETSI-ITS-5 nomenclature, this means for example that the PHY/MAC, network and security layers are implemented in the vehicle-to-X communication unit or respectively in the vehicle-to-X communication module, while the facility and application layers are implemented in the decision unit and, in addition, the signature verification of the message is executed twice, in order to ensure functional safety.

The vehicle-to-X communication module can be developed in the described embodiment as an ASIL QM unit and is accordingly cheaper, since less development effort arises and, possibly, less expensive components can also be used.

In particular, it is possible to refrain from executing the vehicle-to-X communication module in such a way that it is ASIL B-capable.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1: shows a vehicle-to-X communication arrangement.

DETAILED DESCRIPTION

FIG. 1 shows a vehicle-to-X communication arrangement 5 purely schematically according to an exemplary embodiment of the invention. The vehicle-to-X communication arrangement 5 has a decision unit 10 and a vehicle-to-X communication module 20. These are connected to one another by means of a vehicle bus 40 for communication. Furthermore, the vehicle-to-X communication arrangement 5 has an antenna 30 which is joined to the vehicle-to-X communication module 20.

It should be understood that the components are merely represented purely schematically here. The vehicle bus 40 is not typically deemed to be a part of the vehicle-to-X communication arrangement 5, since said vehicle bus also communicatively connects numerous other components, which are present in typical embodiments of a motor vehicle, to one another.

If a vehicle-to-X message is received via the antenna 30, in particular from another vehicle or from an infrastructure facility, said vehicle-to-X message is initially processed in the vehicle-to-X communication module 20. In this connection, tasks such as a security check, a certificate check and a plausibility check are, for example, performed. If required, the vehicle-to-X message is also output again.

The vehicle-to-X message typically contains a signature which is used for the safety check. The vehicle-to-X message is forwarded, following execution of the described tasks, by the vehicle-to-X communication module 20 to the decision unit 10. The signature is also supplied.

The decision unit 10 is a control device which executes numerous further tasks such as, for example, driving assistance functions and safety functions in a motor vehicle. Within the framework of these functionalities, information from the vehicle-to-X communication can be processed. The decision unit 10 is typically already designed to be ASIL B-capable anyway so that it complies with a high safety level.

The decision unit 10 firstly performs a safety check with a received vehicle-to-X message, using the signature which is also supplied. If the result of this safety check is that the vehicle-to-X message is valid and has not been modified, the information contained therein is read out and is used for appropriate tasks. If the result of the safety check is that the vehicle-to-X message has been modified or originates from an unsafe source, the information contained therein is rejected.

Thanks to the implementation described, the vehicle-to-X communication module 20 can be deemed to be transparent so that it only has to have a lower safety standard, thus saving outlay and costs.

It should be mentioned that the functions executed by the vehicle-to-X communication module 20 can also increase safety, for example by checking a message prior to retransmission thereof. The check is, however, repeated, for example in the decision unit 10.

It is pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, for example, a mobile network.

The indicated steps of the method may be executed in the indicated order. They can, however, also be executed in another order, inasmuch as this is technically reasonable. The method can be executed in one of its embodiments, for example with a specific combination of steps, such that no further steps are executed. However, further steps can essentially also be executed, including those which are not indicated.

It is further pointed out that configurations, features and variants of the invention, which are described in the various embodiments or exemplary embodiments and/or shown in the figures, can be combined with one another as desired. Individual or multiple features are interchangeable as desired. Resulting combinations of features are understood to also be covered by the disclosure of this application.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A vehicle-to-X communication arrangement comprising:
    a vehicle-to-X communication device that has a functional-safety level below Automotive Safety Integrity Level B (ASIL B) and that is configured to receive vehicle-to-X messages having a respective signature and to forward said messages in an unmodified condition including the signature;
    a control module of a motor vehicle, wherein the control module performs driving-assistance functions in compliance with at least the ASIL B functional-safety level, and the control module is configured to receive the forwarded vehicle-to-X messages and to perform a safety check with each forwarded message based on each forwarded message's respective signature;

wherein the vehicle-to-X communication device comprises: a PHY/MAC layer, a network layer, and a security layer;

wherein the control module of the motor vehicle comprises: a facility layer and an application layer;

wherein the control module of the motor vehicle and the vehicle-to-X communication device are connected to each other by a vehicle bus in order to exchange data and are each configured to independently execute a respective signature verification of a vehicle-to-X message by decrypting a hash value that is contained in the signature with a public key that is also contained in the signature, calculating a hash value from the vehicle-to-X message, and determining whether the decrypted hash value is identical to the calculated hash value in order to ensure that the control module of the motor vehicle performs driving-assistance functions in compliance with at least the ASIL B functional-safety standard, while the vehicle-to-X communication module complies with a functional-safety standard lower than the ASIL B.

2. The vehicle-to-X communication arrangement according to claim 1, wherein the vehicle-to-X communication device is configured to output received vehicle-to-X messages in an unmodified condition as new vehicle-to-X messages and to execute at least one of multihopping functions and store-and-forward functions.

3. The vehicle-to-X communication arrangement according to claim 1, further comprising an antenna which is connected to the vehicle-to-X communication device.

4. The vehicle-to-X communication arrangement according to claim 1, wherein the vehicle-to-X communication device is configured to perform at least one of: a security check, a certificate check and a plausibility check.

5. A method for receiving vehicle-to-X messages comprising:

receiving, by a vehicle-to-X communication device that has a functional-safety level below Automotive Safety integrity, Level B (ASIL B), respective vehicle-to-X message together with the associated signature in a vehicle-to-X communication module;

forwarding, by the vehicle-to-X communication device and via a vehicle bus, the vehicle-to-X message in an unmodified format with the associated signature to a control module of a motor vehicle, wherein the control module performs driving-assistance functions in compliance with at least the ASIL B functional-safety level;

executing of a safety check for each forwarded vehicle-to-X message based on the respective signature by the control module of the motor vehicle;

wherein the vehicle-to-X communication module comprises: a PHY/MAC layer, a network layer, and a security layer;

wherein the control module of the motor vehicle comprises: a facility layer and an application layer;

executing a signature verification of a vehicle-to-X message with the control module of the motor vehicle and the vehicle-to-X communication module independently from one another by decrypting a hash value that is contained in the signature with a public key that is also contained in the signature, calculating a hash value from the vehicle-to-X message, and determining whether the decrypted hash value is identical to the calculated hash value in order to ensure that the control module of the motor vehicle performs driving- assistance functions in compliance with at least the ASIL B functional-safety standard, while the vehicle-to-X communication module complies with a functional- safety standard lower than the ASIL B.

6. The method according to claim 5, further comprising: outputting received vehicle-to-X messages in an unmodified condition from the vehicle-to-X communication module as new vehicle-to-X messages; and executing at least one of multihopping functions and store-and-forward functions.

7. The method according to claim 5, wherein an antenna is connected to the vehicle-to-X communication module.

8. The method according to claim 5, further comprising performing at least one of:

a security check, a certificate check and a plausibility check with the vehicle-to-X communication module.

* * * * *